March 8, 1927.           H. LANDMAN              1,620,110
                      ICE CREAM DIPPER MOLD
                       Filed March 8, 1926

Witness:                              Inventor,
R. C. Hamilton                     Herman Landman
                               By Thorper Gerard
                                         Attys.

Patented Mar. 8, 1927.

1,620,110

UNITED STATES PATENT OFFICE.

HERMAN LANDMAN, OF KANSAS CITY, MISSOURI.

ICE-CREAM-DIPPER MOLD.

Application filed March 8, 1926. Serial No. 93,121.

This invention relates to ice cream dipper molds of that type adapted for cutting a slice of ice cream from a mass in a freezer or the like, and for delivering such slice upon a plate or upon a confection to form a part of what is known as an ice cream sandwich, this invention being designed primarily as an improvement on the corresponding device filed May 18, 1925, Serial No. 30,995 and allowed October 19, 1925. My particular objects in this improvement are to produce a more efficient, economical and sanitary dipper mold, and one which possesses greater rigidity and strength.

With these general objects in view, the invention consists in certain novel and useful features of construction and combinations of parts as hereinafter described and claimed; and in order that it may be fully understood, reference is to be had to the accompanying drawing, in which:

Figure 1:
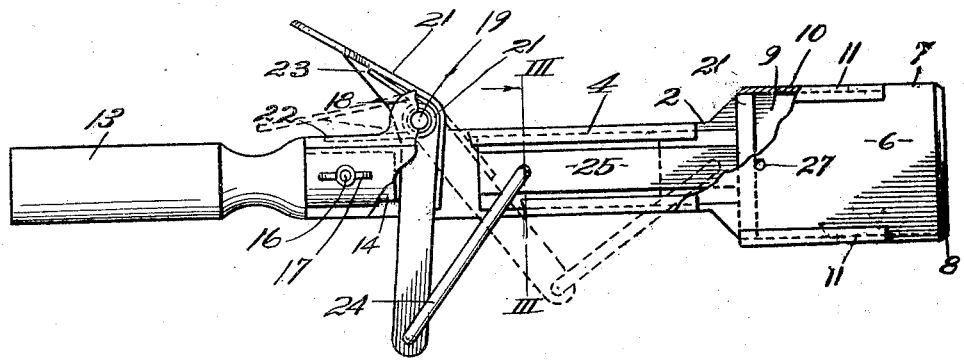
Figure 1 is a side elevation, partly broken away, of a dipper mold embodying the invention.
Figure 2:
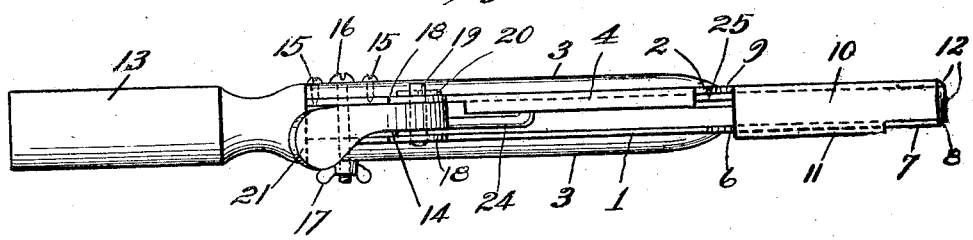
Figure 2 is a top or edge view of the same.
Figures 3, 4:
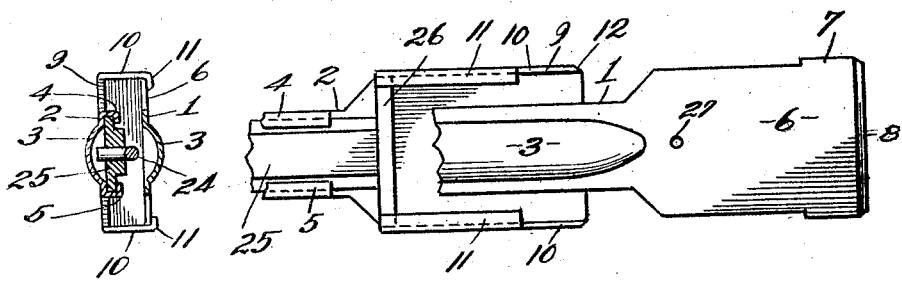
Figure 3 is a cross section on the line III—III of Figure 1.
Figure 4 is a fragmentary side elevation with the parts shown in the relative positions in which they occur in assembling them together or separating them for convenience of effecting a thorough cleansing thereof.

Referring to the drawing in detail, 1 and 2 represent a pair of parallel plates or sides spaced apart, and each with the greater portion of its length bowed outwardly as at 3 for stiffening or strengthening purposes, and the side 2 is provided at its upper and lower margins with inturned angle flanges 4 and 5 to constitute guide ways for a slidable part hereinafter mentioned. The side 1 is provided at its front end with a rectangular enlargement 6, widened at its front end at 7, and beveled inwardly at its front extremity as at 8, to constitute a cutting edge.

The corresponding end of the side 2, also has a rectangular enlargement 9 which corresponds in width for its full length to plate 6 where widened at the end to constitute extensions 7, and said widened end 9 is provided with parallel flanges 10 to bridge the space between said ends 6 and 9 and fit snugly upon the edges of the former rearward of its widened portion and against the opposed inner face of the said portion 7. The flanges 10 have flanges 11 which overlap the outer side of end 6 rearward of the widened portion 7 thereof, to lock the end 6 against separating or spreading movement relative to enlargement 9, the widened end 7 being incidentally locked flatly against the opposing edges of flanges 10 forward of the flanges 11. This arrangement produces a mold or hollow head as solid as if cast in a single piece for all practical purposes, and the front ends of the enlargement 9 and flanges 10 are beveled inwardly as at 12, so that in conjunction with the beveled end 8 said mold or hollow head may be readily forced into a frozen mass of cream from which a slice or slab is to be cut.

A suitable handle 13 of wood or any other material, is provided with a narrowed extension 14 to fit between the rear ends of the sides 1 and 2, this handle extension 14 being secured rigidly to the side 2 by rivets or screws 15. To secure the side 1 firmly yet detachably to the handle, a screw bolt 16 extends through side 2, extension 14 and side 1, and is engaged by a clamping wing-nut 17. Just forward of the handle, the sides are provided with upwardly-projecting ears 18, and extending through said ears is a pivot pin 19, a removable device, such as a cotter 20, extending through said pin and engaging the ear of side 2 to prevent endwise movement of the pin in one direction through said ear. An angle lever 21 fitting snugly between the sides, is rigidly secured on said pivot pin, and the other end of the pin extends loosely through the side 1, so that the latter may be readily sprung onto or off the pin in assembling the parts together or in separating them.

A coil spring 21 is mounted on pin 19, and has one end 22 bearing on the extension 14 of the handle, and the other end 23 bearing against the under side of the upper or handle end of the lever, the spring tending to hold the lower end of the lever pressed rearwardly against the front end of the handle extension 14. A link 24 pivotally connects the lower end of the lever with a slide bar 25 fitting in the guide grooves provided between the side 2 and the angle flanges 4 and 5 thereof, so that said bar shall be capable only of endwise movement, and at the front end of said bar is a plunger 26 of a size to fit snugly in the hollow mold or head, which as indicated at 27 is provided at one side with an opening constituting a gage to determine when the mold is fully charged with ice cream, it being noted that when the plunger is fully withdrawn, as shown, its front face is in the plane of the rear edge of the opening through which the slice or slab of cream may be observed, as in practice the pressure, with which the device is forced into a mass of cream, will cause the latter to bulge outward slightly through the said gage opening 27.

The device, with its parts in normal position as shown by Figure 1, is adapted to be thrust into a mass of ice cream. In this action, a slice or slab is cut from the mass and fills the mold or head, entrapped air escaping from the mold around the plunger and also through the gage opening 27 so that a full charge of the ice cream may be obtained. The operator then withdraws the device from the mass and effects the discharge or dislodgment of the slice or slab by applying pressure with his thumb upon the handle end of the lever, this pressure through the link 24, sliding the plunger forward until its front face is about flush with the front extremity of the mold or head. As the ejectment of the slice or slab is thus effected upon a plate or any other article, such as a cake, wafer, cracker or the like, the pressure on the lever is released and the spring 21 reacts and returns the plunger to its initial position. The device is then ready to cut a second slice or slab. To guard against sliding the plunger completely beyond the front end of the mold or head, the parts are so proportioned that the handle end of the lever shall strike the handle, the flange 5 being shorter than flange 4 to accommodate the required range of movement of the lever for the disposition of the plunger at the front extremity of the mold.

It will be apparent from the foregoing that the flanges 11 guard effectually against spreading or separating of the sides of the mold in the ice cream cutting operation and also that the widened front end of the enlargement 6 by bearing against the front ends of flanges 10, maintain the component parts of the head in proper relative position longitudinally and relieve the screw bolt of strain tending to bend the same as the thrust into the ice cream is made, which screw bolt and its nut, in effect, constitute part of the locking features for the mold members.

When it is desired to thoroughly clean the device, the operator can remove the wing-nut 17 and repress the screw bolt 16 until its threaded extremity is about flush with the bowed portion of side 1. He can then spring said side outward slightly to disengage it from the screw bolt and then push the side 1 forwardly so as to slide it and its enlarged end from engagement with the flanges 11. This separation of the parts permits of ready and thorough cleansing thereof, and if it is desired to remove the plunger also, the link 24 may be readily disengaged from the slide bar 25. If it is desired to remove the lever, though that ordinarily will not be necessary, the end 22 of the spring, can be raised from engagement with the handle and the lever moved laterally to withdraw the pin 19 from engagement with the side 2, it being understood of course that preliminary to this operation, the cotter 20 must be removed. The parts are re-assembled by reversing the operations described, and these operations can be performed very quickly and without the use of any tools.

From the above description, it will be apparent that I have produced an ice cream dipper mold embodying the features of advantage set forth as desirable in the statement of the objects of the invention, and which may be modified in minor particulars without departing from the spirit and scope of the appended claims.

I claim:

1. An ice cream mold consisting of a handle, and a pair of dipper mold members, one of said members being secured to said handle and having side portions with inturned flanges on said side portions and the other of said members being removably held by said flanges and removably attached to the handle.

2. An ice cream mold consisting of a handle, a pair of dipper mold members, one of said members being secured to said handle and having side portions with inturned flanges on said side portions and the other of said members being removably held by said flanges and removably attached to the handle, and means operable from the handle to eject the contents of the mold.

3. An ice cream mold consisting of a handle, a pair of dipper mold members, one of said members being secured to said handle and having side portions with inturned flanges on said side portions and the other of said members being removably held by said flanges and removably attached to the handle, a plunger for reciprocation between the mold members for ejection of the contents thereof, a plunger stem, guide flanges on the flange-equipped mold member for guiding said stem, and means adapted to be actuated from said handle to reciprocate said plunger and plunger stem.

In witness whereof I hereunto affix my signature.

HERMAN LANDMAN.